(12) United States Patent
Frost

(10) Patent No.: US 11,142,273 B2
(45) Date of Patent: Oct. 12, 2021

(54) LUGGAGE HOLDER FOR A BICYCLE

(71) Applicant: London Recumbents Ltd, Bexley (GB)

(72) Inventor: Nigel Frost, London (GB)

(73) Assignee: London Recumbents Ltd, Bexley (GB)

( * ) Notice: Subject to any disclaimer, the term of this patent is extended or adjusted under 35 U.S.C. 154(b) by 38 days.

(21) Appl. No.: 16/464,321

(22) PCT Filed: Nov. 28, 2017

(86) PCT No.: PCT/EP2017/080730
§ 371 (c)(1),
(2) Date: May 28, 2019

(87) PCT Pub. No.: WO2018/096185
PCT Pub. Date: May 31, 2018

(65) Prior Publication Data
US 2021/0024157 A1 Jan. 28, 2021

(30) Foreign Application Priority Data

Nov. 28, 2016 (GB) ..................................... 1620064

(51) Int. Cl.
*B62J 7/04* (2006.01)
*B62J 9/26* (2020.01)
*B62J 7/08* (2006.01)

(52) U.S. Cl.
CPC . *B62J 7/04* (2013.01); *B62J 9/26* (2020.02); *B62J 7/08* (2013.01)

(58) Field of Classification Search
CPC ......... B62J 7/04; B62J 7/08; B62J 9/26; B62J 11/00
See application file for complete search history.

(56) References Cited

U.S. PATENT DOCUMENTS

| 4,566,617 A | 1/1986 | Jackson |
| 5,406,816 A * | 4/1995 | Thomas ..................... B62J 7/06 |
| | | 62/457.1 |

(Continued)

FOREIGN PATENT DOCUMENTS

| DE | 9408781 U1 | 9/1994 |
| DE | 19654793 A1 | 7/1998 |

(Continued)

OTHER PUBLICATIONS

International Search Report and Written Opinion for PCT/EP2017/080730 dated Mar. 14, 2018 (12 pages).

(Continued)

*Primary Examiner* — Corey N Skurdal
(74) *Attorney, Agent, or Firm* — Bejin Bieneman PLC

(57) ABSTRACT

A luggage holder for use with a bicycle, the luggage holder including: a structure including a channel for receiving a tongue of a handle member; the handle member being configured to be securable to luggage; and, a retaining mechanism. The retaining mechanism further includes a moveable member which is displaceable from a biased position by insertion or withdrawal of the tongue in or from the channel using a predetermined force to permit insertion or withdrawal of the tongue in or from the channel. The moveable member returns to the biased position to prevent withdrawal the tongue from the channel using a force less than the predetermined force.

20 Claims, 20 Drawing Sheets

(56) References Cited

U.S. PATENT DOCUMENTS

| | | | | |
|---|---|---|---|---|
| 5,460,303 | A | * | 10/1995 | Downs ........................ B62J 9/00 224/427 |
| 5,593,126 | A | * | 1/1997 | Muderlak .................. B62J 9/26 248/316.7 |
| 5,655,694 | A | * | 8/1997 | Keckeisen ................. B62J 9/26 224/430 |
| 6,206,258 | B1 | | 3/2001 | Calder |
| 7,264,308 | B2 | * | 9/2007 | Bigolin .................... B62J 11/00 297/188.12 |
| 7,625,041 | B2 | * | 12/2009 | Bigolin ...................... B62J 1/08 297/195.1 |
| 10,604,204 | B2 | * | 3/2020 | Chee .......................... B62J 9/26 |
| 2004/0041065 | A1 | | 3/2004 | Ling |
| 2008/0111344 | A1 | | 5/2008 | Chuang |
| 2009/0039125 | A1 | | 2/2009 | Bock et al. |
| 2009/0289091 | A1 | | 11/2009 | Ulrich |

FOREIGN PATENT DOCUMENTS

| | | |
|---|---|---|
| DE | 29905254 U1 | 6/1999 |
| DE | 29905798 U1 | 6/1999 |
| DE | 20109775 U1 | 11/2001 |
| FR | 2957814 A1 | 9/2011 |
| GB | 623353 A | 5/1949 |

OTHER PUBLICATIONS

GB Intellectual Property Office Combined Search and Examination Report under Sections 17 & 18(3) for Application No. GB1620064.4 dated Apr. 18, 2017 (5 pages).

Japanese Patent Office Notice of Reasons for Refusal dated Jun. 29, 2021 for Application No. JP2019-548770 (12 pages; with English machine translation).

\* cited by examiner

SECTION I-I

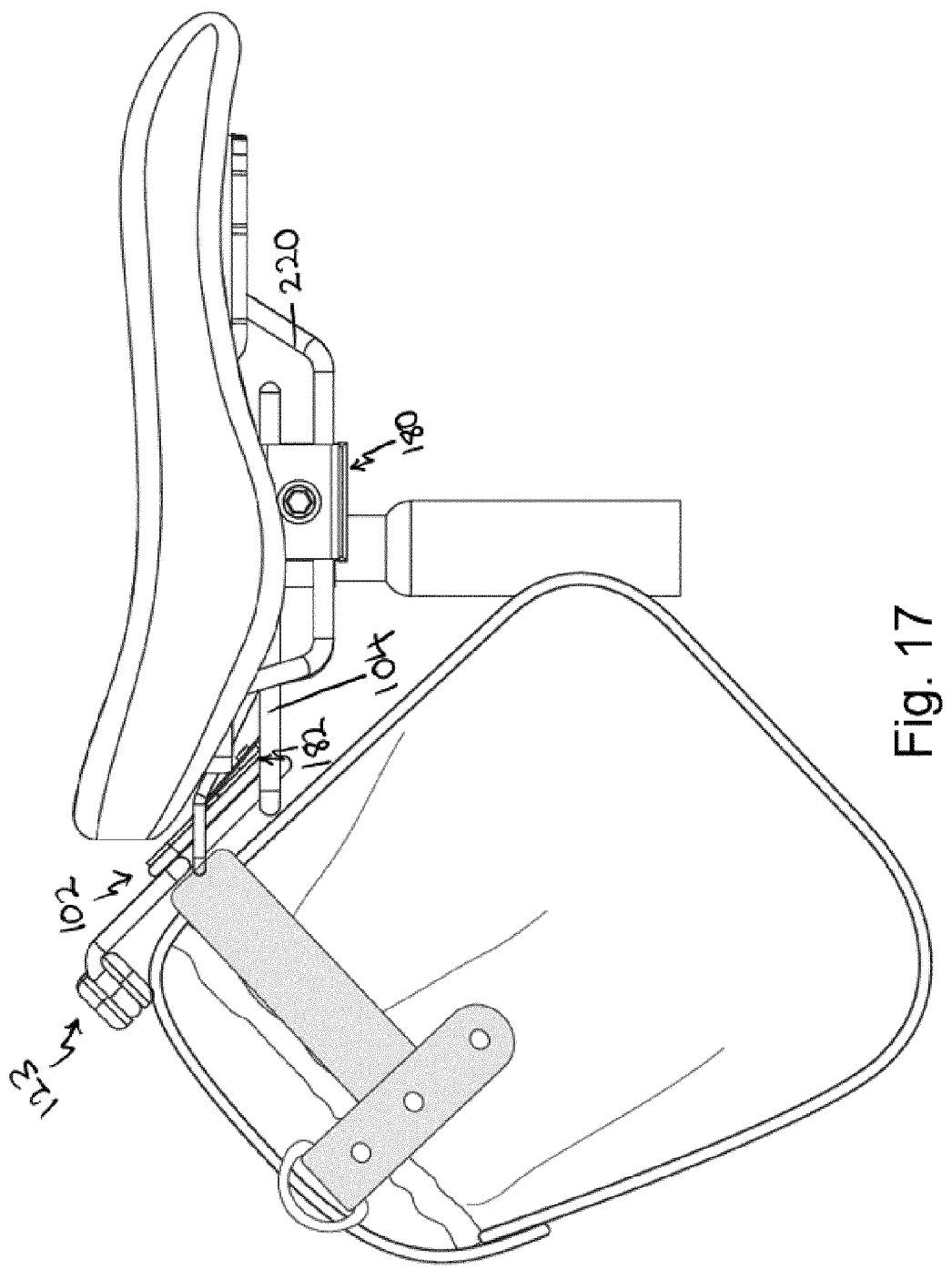

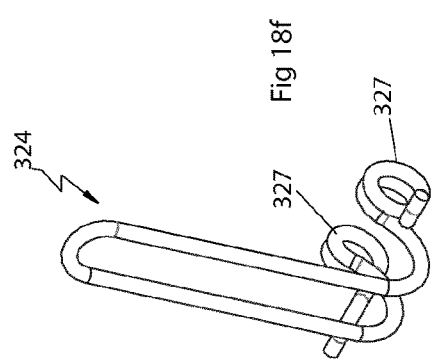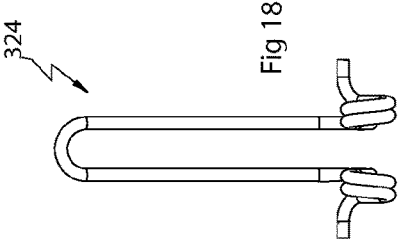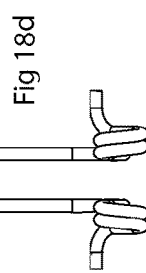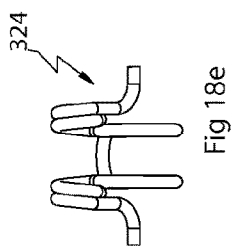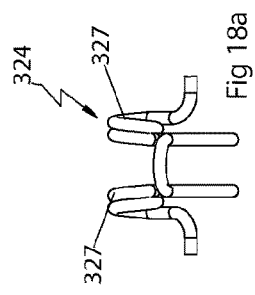

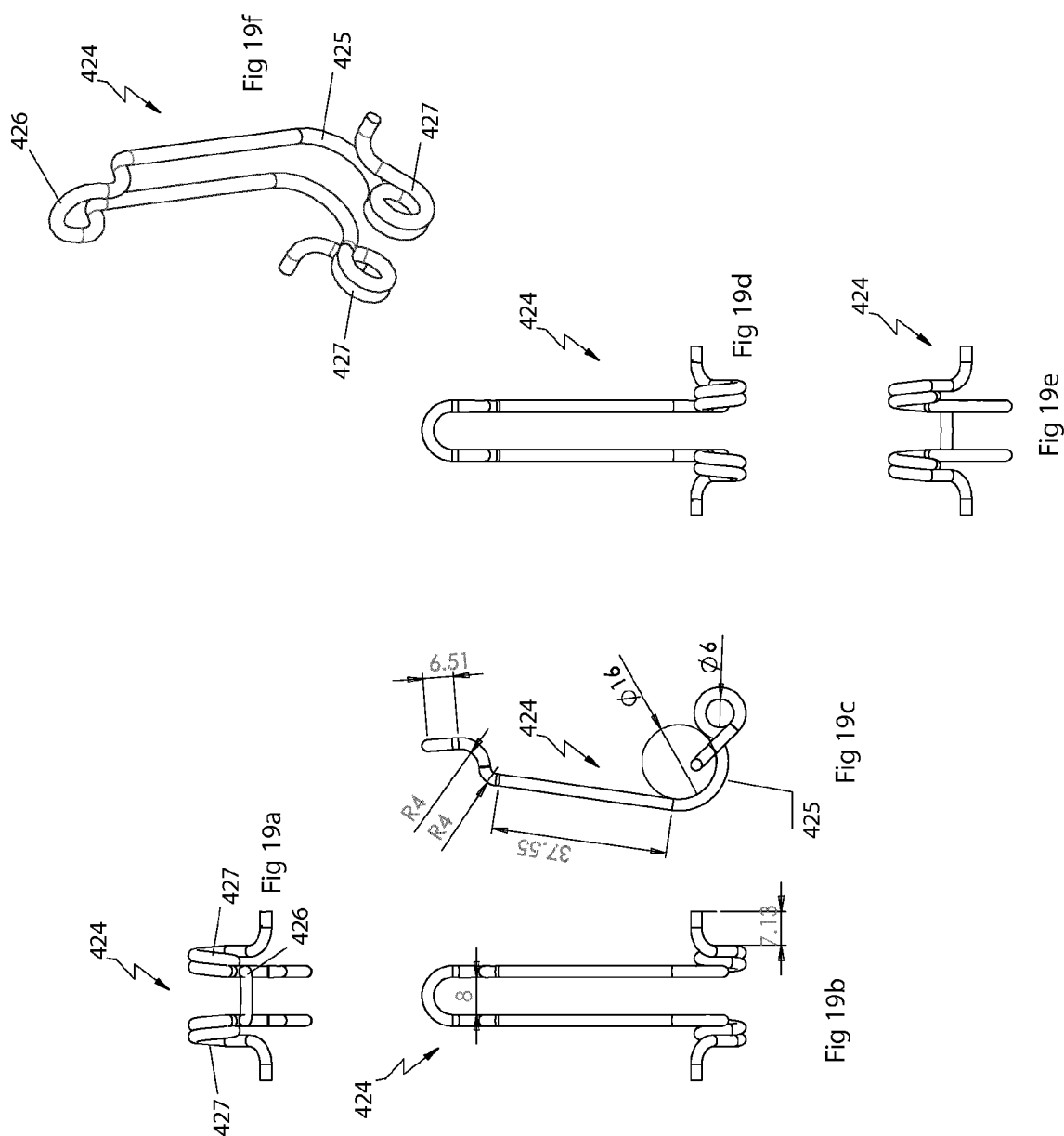

LUGGAGE HOLDER FOR A BICYCLE

CROSS-REFERENCE TO RELATED APPLICATIONS

This application is a national stage of, and claims priority to, Patent Cooperation Treaty Application No. PCT/EP2017/080730, filed on Nov. 28, 2017, which application claims priority to Great Britain Application No. GB1620064.4, filed on Nov. 28, 2016, which applications are hereby incorporated herein by reference in their entireties.

FIELD OF THE DISCLOSURE

This disclosure generally relates to a luggage holder for use with a bicycle. More specifically, the disclosure relates to a luggage holder arranged to be cantilevered from, for example, a seat post of a bicycle.

BACKGROUND

Cycling is becoming increasingly popular as a convenient and low-cost mode of transportation. This is particularly true in urban areas where there are more cyclists than ever before. Due to increasing reliance on bicycles in their daily lives, cyclists are often required to carry loads while cycling, such as clothing, shopping, and the like. For convenience, these loads are often carried in bags or luggage arranged to be connected to bicycles using luggage holders including some sort of releasable latching or bracketing means. However, known luggage holders can be cumbersome to use. For example, some luggage holders, such as saddle bags, are configured to hang from tabs at the back of saddles using straps connected by a buckle. However, access to the tabs is limited because of space restrictions under saddles, which makes attaching and removing saddle bags awkward and sometimes difficult. Moreover, this arrangement limits the load that can be carried by saddle bags. Also, some luggage holders can only be operated using two hands: one hand for supporting the load while attaching or removing the luggage from the bicycle, while the other hand is used to engage or disengage the latching means. This two-handed operation means that the bicycle itself is left unsupported and likely to fall over unless propped against a wall or the like.

This disclosure seeks to overcome or substantially mitigate the foregoing problems with known luggage holders for bicycles.

SUMMARY

According to an aspect of the disclosure, there is provided a luggage holder for use with a bicycle, the luggage holder including a structure including a channel for receiving a tongue of a handle member, the handle member being configured to be securable to luggage, such as a saddle bag, and a retaining mechanism including a moveable member which is displaceable from a biased position by insertion or withdrawal of the tongue in or from the channel using a predetermined force to permit insertion or withdrawal of the tongue in or from the channel but which returns to the biased position to prevent withdrawal the tongue from the channel using a force less than the predetermined force. This luggage holder provides a straightforward apparatus for carrying luggage on a bicycle that is both quick and easy to employ. It is particularly beneficial as the retaining mechanism enables the handle member to be retained automatically by the luggage holder by the mere action of inserting the tongue of the handle member in the channel of the luggage holder using the predetermined force. This means that the moveable member of the retaining mechanism operates simply by movement of the tongue without additional user operation. The handle member can then be released from the luggage holder by simply pulling the tongue out from the channel using the predetermined force. Thus, a user can easily operate the luggage holder using only one hand as it does not require the use of any additional locking connectors or latch mechanisms. Also, the fact that luggage holder is arranged to carry the handle member as opposed to carrying the luggage directly means that different sizes of luggage, and so loads, can be secured to the luggage holder. The luggage holder can advantageously be used with a traditional saddle bag attachment strap.

Optionally, the luggage holder includes a first u-shaped rail, a second u-shaped rail superimposed over the first u-shaped rail in a parallel relationship therewith, wherein one of the first u-shaped rail or the second u-shaped rail is configured to be cantilevered from the bicycle, a third u-shaped rail interposed between each of the first and the second u-shaped rails, wherein the distal ends of the first and the second u-shaped rails and the third u-shaped rail in combination define a channel for receiving the tongue of the handle member.

Optionally, the distal end of the second u-shaped rail extends beyond the distal end of the first u-shaped rail such that an acute angle is formed between the distal ends when measured from a plane perpendicular to the first and the second u-shaped rails, and wherein the third u-shaped rail is inclined by the acute angle. This angled arrangement means that the channel defined by the three rails is also angled away from the bicycle. This provides additional clearance from the bicycle for inserting and withdrawing the tongue of the handle member into and out from the channel. Without this angled arrangement, the lever arm of the luggage holder would have to be increased in order to provide similar clearance, which would reduce the load bearing capabilities of the luggage holder. The angled arrangement of the three rails defining the channel also means that there is a horizontal component to the predetermined force required to pull the tongue of the handle member out of the channel making it easier to apply than when compared to a force including only a vertical component.

Optionally, the acute angle is less than 45 degrees. The fact that the acute angle is less than 45 degrees means that the lever arm of the luggage holder is minimised. That is, the extent to which the handle member is cantilevered from the bicycle when retained in the luggage holder is minimised, and so consequently maximises the load bearing capabilities of the luggage holder. The acute angle is advantageous as it allows luggage to be secured in such a way that the tongue is pointing down and sits close to parallel with the back surface of the luggage. Alternatively, the acute angle is substantially 45 degrees or greater, provided it is less than 90 degrees. This alternative arrangement increases the clearance from the bicycle for inserting and withdrawing the tongue of the handle member into and out from the channel.

Optionally, a lower section of the moveable member includes a ledge for supporting the end of the tongue when the tongue is retained in the channel. The ledge also limits the extent to which the tongue can be inserted into the channel.

Optionally, the moveable member includes an arcuate cantilever spring fixed at one end to an upper section of the third u-shaped rail section, the arcuate cantilever spring being arranged in the biased position to substantially traverse the channel.

Optionally, the arcuate cantilever spring is configured such that its apex is adjacent the distal end of the first u-shaped rail section. Alternatively, the arcuate cantilever spring is configured such that its apex abuts the distal end of the first u-shaped rail section.

Optionally, the third u-shaped rail includes two shoulder sections arranged to wrap around the underside of the first rail. The two shoulder sections can be used during the manufacture of the luggage holder to locate the third u-shaped rail with respect to the first and second u-shaped rails for the purposes of welding or the like.

Optionally, the moveable member is configured to facilitate insertion of the tongue. Optionally, the moveable member is configured to secure or hold the tongue when inserted fully in the channel. The moveable member may include a surface feature or features or form which is/are configured to follow or move over the form or surface of the tongue when the tongue is inserted in the channel. The surface feature may include one or more of a rounded feature, a cam surface, a chamfer, a lobe, a fillet or other suitable surface. Such surface features allow or facilitate the moveable member to be moved by the action of the insertion of the tongue into the channel. The surface feature may also be configured to secure or retain the tongue in position, for example by engaging into an opening in the tongue. The surface feature or features of the moveable member may be configured to follow the form of the tongue upon withdrawal to cause movement of the movable member to allow the tongue to be removed upon application of a predetermined force, for example a force to overcome a spring force. The surface features may be configured or formed to provide a greater resistance to withdrawal than insertion of the tongue in the channel. The tongue may be provided with a complementary surface feature or features to facilitate insertion and/or locking of the tongue in the channel. It is also envisaged that the tongue may alternatively be provided with a moveable member which is moved by insertion into the channel to lock with a part of the channel when fully inserted.

Optionally, the moveable member includes a protrusion arranged to engage with the tongue when the tongue is inserted fully into the channel. This locking arrangement prevents accidental withdrawal or movement of the tongue.

Optionally, the protrusion includes a rounded end to ride over the circular cross-section of the tongue without jamming upon insertion and withdrawal.

Optionally, the rounded end of the protrusion is hemispherical in form. This form allows for smooth insertion and withdrawal of the tongue.

According to a second aspect of the disclosure, there is provided a kit of parts including a luggage holder according to the first aspect of the disclosure, a handle member including a tongue arranged to be inserted in the channel of the luggage holder, and means for clamping the luggage holder to the bicycle. The clamping can be to the first u-shaped rail or the second u-shaped rail.

According to a third aspect of the disclosure, there is provided a handle including a tongue configured to be received in the channel of a luggage holder.

The handle may be formed with a receiving part, for example an aperture, cavity or indentation, to receive the movable member of the holder to provide a degree of interlocking therebetween.

The handle may be formed generally in the shape of a "T".

The handle may comprise open frame, which may be formed of a metal rod or wire.

Optionally, the tongue of the handle member is generally u-shaped. This allows for manufacture with minimal components as well as a light weight handle.

Optionally, the handle includes a grip for handling by a user. The grip may be formed of laminations, for example of wood.

Optionally, the handle may be attached to a luggage item. The handle may be attached using material loops around the frame of the handle to provide pivoting between the handle and item of luggage.

According to a fourth aspect of the disclosure, there is provided a luggage item and a handle as described in respect of the third aspect of the disclosure.

BRIEF SUMMARY OF THE DRAWINGS

The above and other aspects of the disclosure will now be described, by way of example only, with reference to the accompanying drawings, in which:

FIG. 17 shows a side view of the luggage holder of FIG. 6 with the handle member in place and attached to an item of luggage.

FIGS. 18a-18f show an alternative movable member from different orientations;

FIGS. 19a-19f show an alternative movable member from different orientations.

In the drawings, like parts are denoted by like reference numerals.

DETAILED DESCRIPTION

Figure 1:
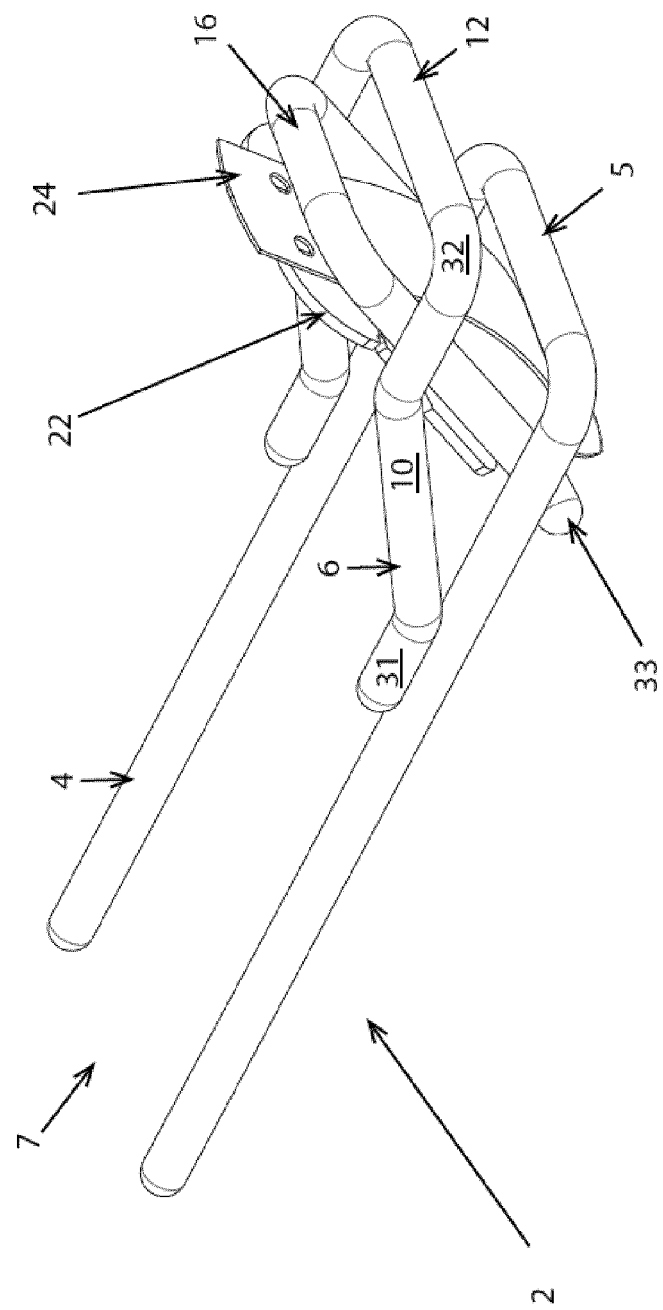
FIG. 1 is a perspective view of a luggage holder.

FIG. 1 shows an embodiment of a luggage holder (hereinafter "the holder 2") generally designated by 2. The holder 2 includes a first u-shaped rail (hereinafter "the first rail 4") formed of a bent rod with circular cross section arranged to be cantilevered at its open end 7 from the seat post of a bicycle in a generally horizontal plane using a suitable clamping or bracketing means 80. The first rail 4 includes a closed distal end 5.

Figure 2:
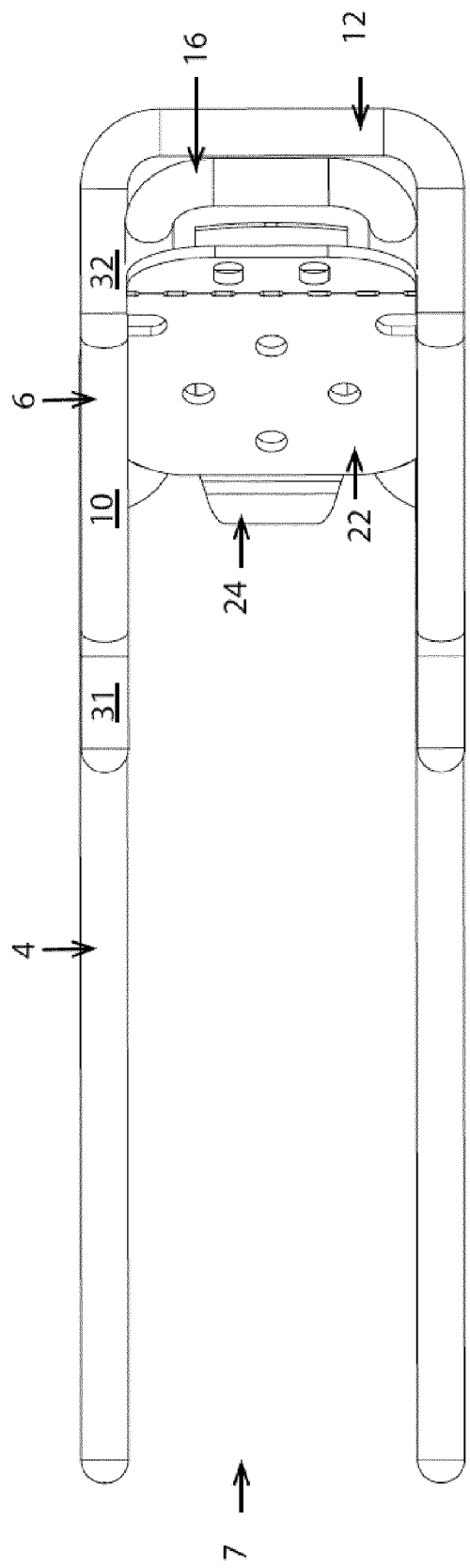
FIG. 2 is an upper plan view of the luggage holder of FIG. 1.

The holder 2 further includes a second u-shaped rail (hereinafter "the second rail 6") formed of a bent rod with circular cross section substantially superimposed over the first rail 4, as shown in FIG. 2. Turning back to FIG. 1, the second rail 6 generally includes three sections: a lower end section 31; a central section 10; and, an upper end section 32 terminating in a closed distal end 12. The lower end section 31 is fixedly attached to a middle region of the first rail 4. The central section 10 is upwardly inclined and terminates at the upper end section 32, which extends in a generally horizontal plane. This arrangement ensures that the upper end section 32 of the second rail 6 is offset by a distance from and substantially parallel with the first rail 4.

Figure 3:
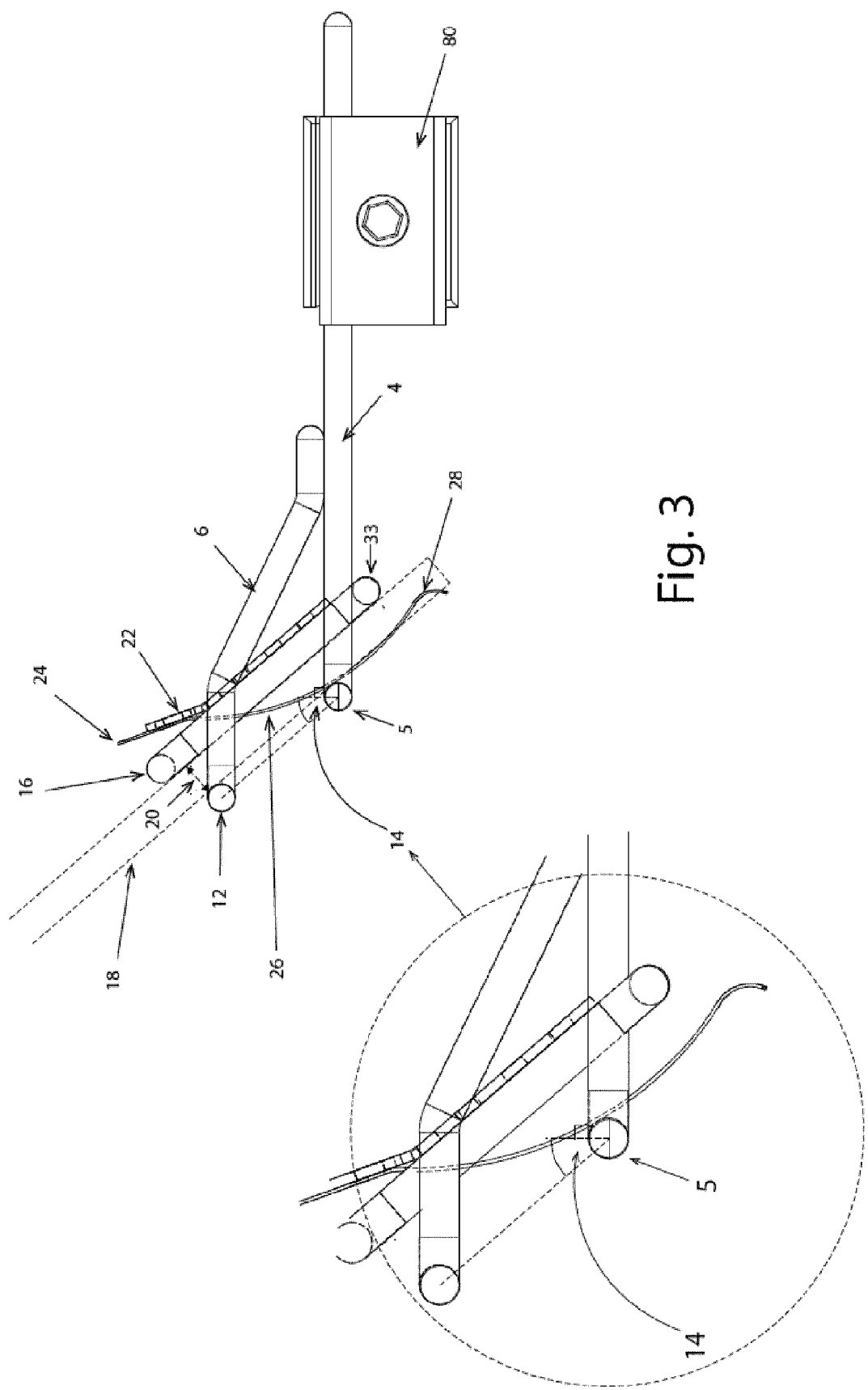
FIG. 3 is a side view of the luggage holder of FIG. 1.

With reference to FIG. 3, a distal end 12 of the second rail 6 extends beyond the distal end 5 of the first rail 4. That is to say, the distal end 12 of the second rail 6 overhangs or protrudes beyond the distal end 5 of the first rail 4. This protrusion offsets the distal ends 5, 12 by an acute angle 14 measured from a plane perpendicular to the first rail 4. In the embodiment shown, the angle 14 is less than 45 degrees but it will be apparent to those skilled in the art that the angle 14 could be 45 degrees or greater.

Figure 4:
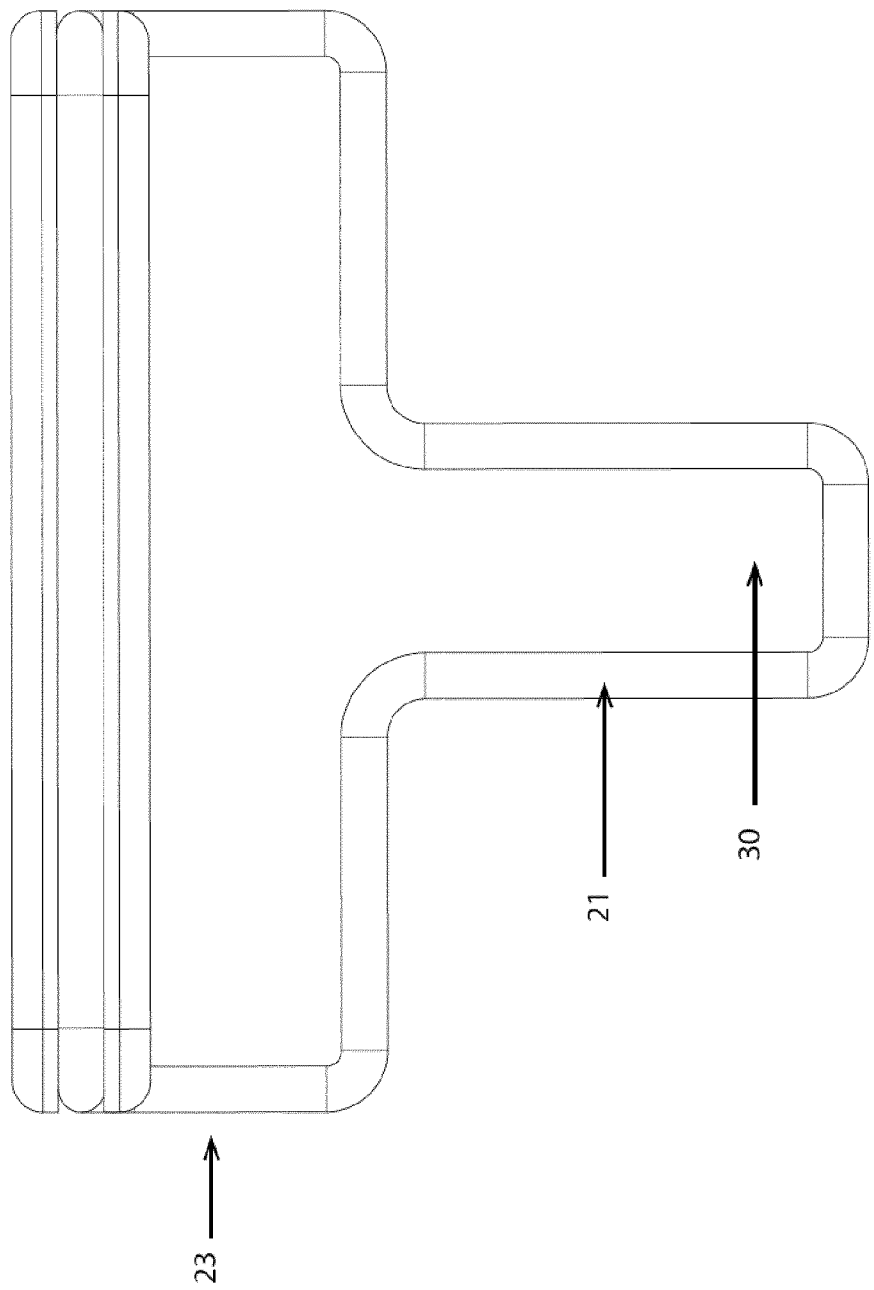
FIG. 4 shows a handle for use with the luggage holder of FIG. 1.

The holder 2 further includes a third u-shaped rail (hereinafter "the third rail 16") formed of a bent rod with circular cross section interposed between and fixedly attached to each of the first and the second rails 4, 6. The third rail 16 includes two shoulders 33, which wrap around the underside of the first rail 4. The third rail 16 is inclined toward the distal ends 5, 12 of the first and the second rails 4, 6 at an angle substantially equal to the angle 14 formed by the offset between the distal ends 5, 12. The combination of the third rail 16 and the distal ends 5, 12 of the first and the second rails 4, 6 establishes a boundary 18, indicated by broken lines, which defines a channel 20 extending through the first and the second rails 4, 6. The channel 20 includes a generally uniform cross-sectional area and is configured to receive a tongue 21 of a handle member 23, as shown in FIG. 4. The handle member 23 is arranged to be securable to luggage, such as a saddle bag. The tongue 21 includes a hollowed or open frame section, generally designated by 30. The cross-sectional dimensions of the tongue 21 are substantially similar to the cross-sectional dimensions of the boundary 18, such that the tongue 21 is guided through the channel 20 by the boundary 18 so as to minimise lateral motion therebetween.

Figure 5:
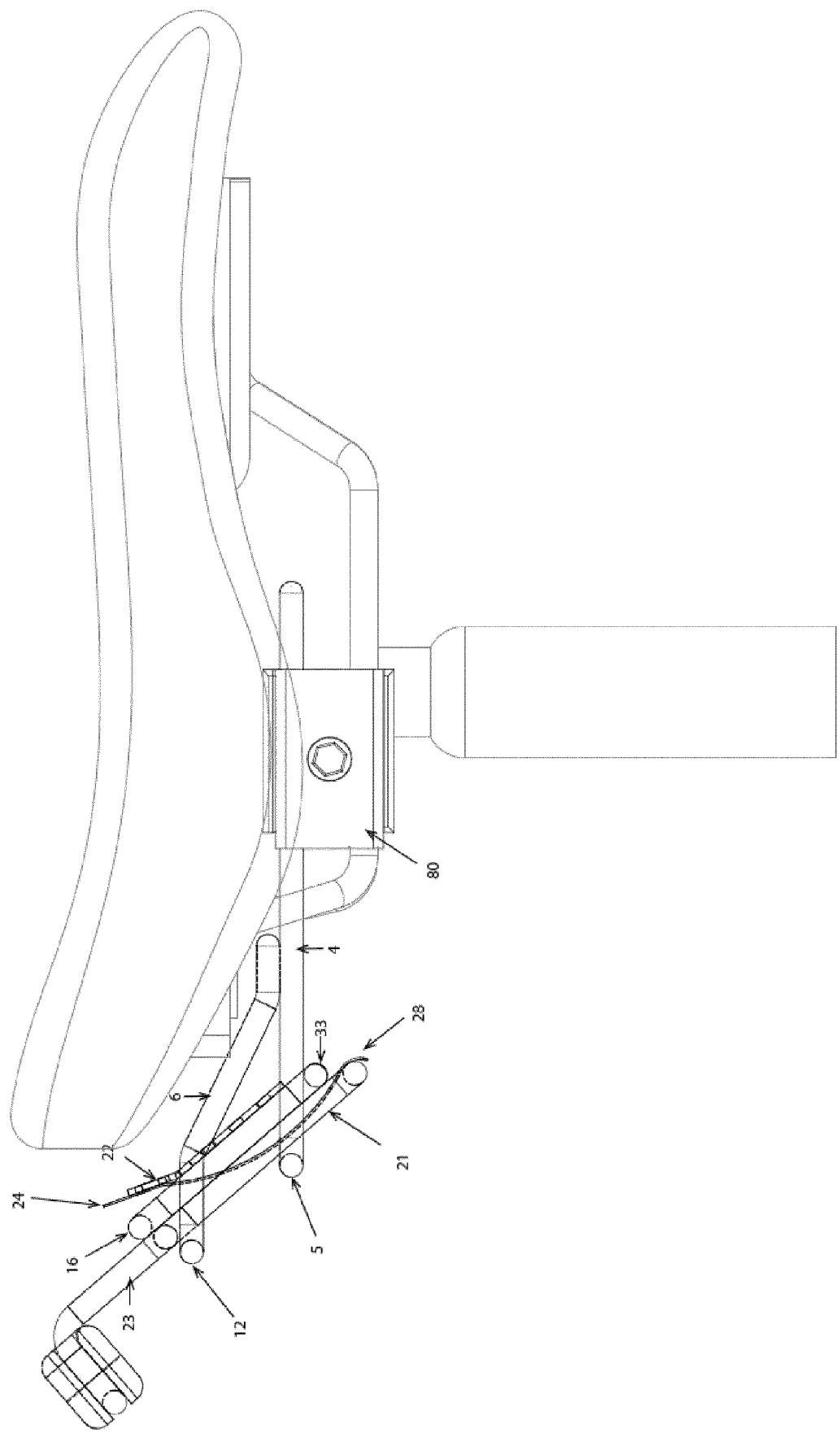
FIG. 5 shows a side view of the luggage holder of FIG. 1 including the handle of FIG. 4.

A plate 22 is fixedly attached to the back of the third rail 16. A movable member in the form of an arcuate cantilever spring 24 (hereinafter "the spring 24") is fixedly attached at its upper end to an upper section of the plate 22 and is configured to downwardly extend through the first, second and third rails 4, 6, 16. The width of the spring 24 is less than the width of the hollowed section 30 of the tongue 21. The spring 24 is biased in a position in which it substantially traverses the channel 20 so as to block the channel 20. In the embodiment shown, the spring 24 is positioned such that the apex of its curved section 26 sits adjacent the distal end 5 of the first rail 4. It will be apparent to those skilled in the art, however, that the spring 24 could be configured such that the apex of its curved section 26 abuts the distal end 5 of the first rail 4. The free end of the spring 24 includes a ledge 28 that is configured to support the end of the tongue 21 when the tongue 21 is inserted in the channel 20, as shown in FIG. 5.

In use, the handle member 23 is retained in the holder 2 by manually inserting the tongue 21 into the top end of the channel 20. When the end of the tongue 21 reaches the curved section 26 of the spring 24, continued movement of the tongue 21 using a predetermined force displaces the spring 24 from the biased position, traversing the channel 20, to an open position, in which the apex of the curved section 26 has moved away from the distal end 5 of the first rail 4, allowing the end of the tongue 21 to pass between the apex of the curved section 26 and the distal end 5 of the first rail 4. Continued movement of the tongue 21 permits the apex of the curved section 26 to pass back through the hollowed section 30 of the tongue 21 thereby returning the spring 24 to its biased position, traversing the channel 20. The insertion of the tongue 21 is completed once the end of the tongue 21 abuts the upper surface of the ledge 28. Once the insertion of the tongue 21 is completed, the spring 24, in its biased position traversing the channel 20, prevents withdrawal of the tongue 21 from the channel 20 using a force less than the predetermined force.

The handle member 23 is released from the holder 2 by pulling the tongue 21 out of the channel 20 using the predetermined force. This, again, displaces the spring 24 from the biased position to the open position, allowing the end of the tongue 21 to pass between the apex of the curved section 26 and the distal end 5 of the first rail 4, and eventually out of the upper end of the channel 20. The spring 24 then reverts back to the biased position traversing the channel 20.

Various modifications will be apparent to those skilled in the art. For example, the second rail 6 could be located below the first rail 4. In which case, the distal end 5 of the first rail 4 would overhang or protrude beyond the distal end 12 of the second rail 6, and the spring 24 is positioned such the apex of its curved section 26 sits adjacent the distal end 12 of the second rail 6.

Moreover, the holder 2 does not necessarily need to be cantilevered from the seat post, but instead could be attached to another part of the bicycle.

Alternatively, the first, second and third rails 4, 6, 16 could be arranged such that the channel 20 is substantially perpendicular to the first and the second rails 4, 6. In this arrangement, there would be no overhang between the distal ends 5, 12 of the first and the second rails 4, 6.

Figure 6:
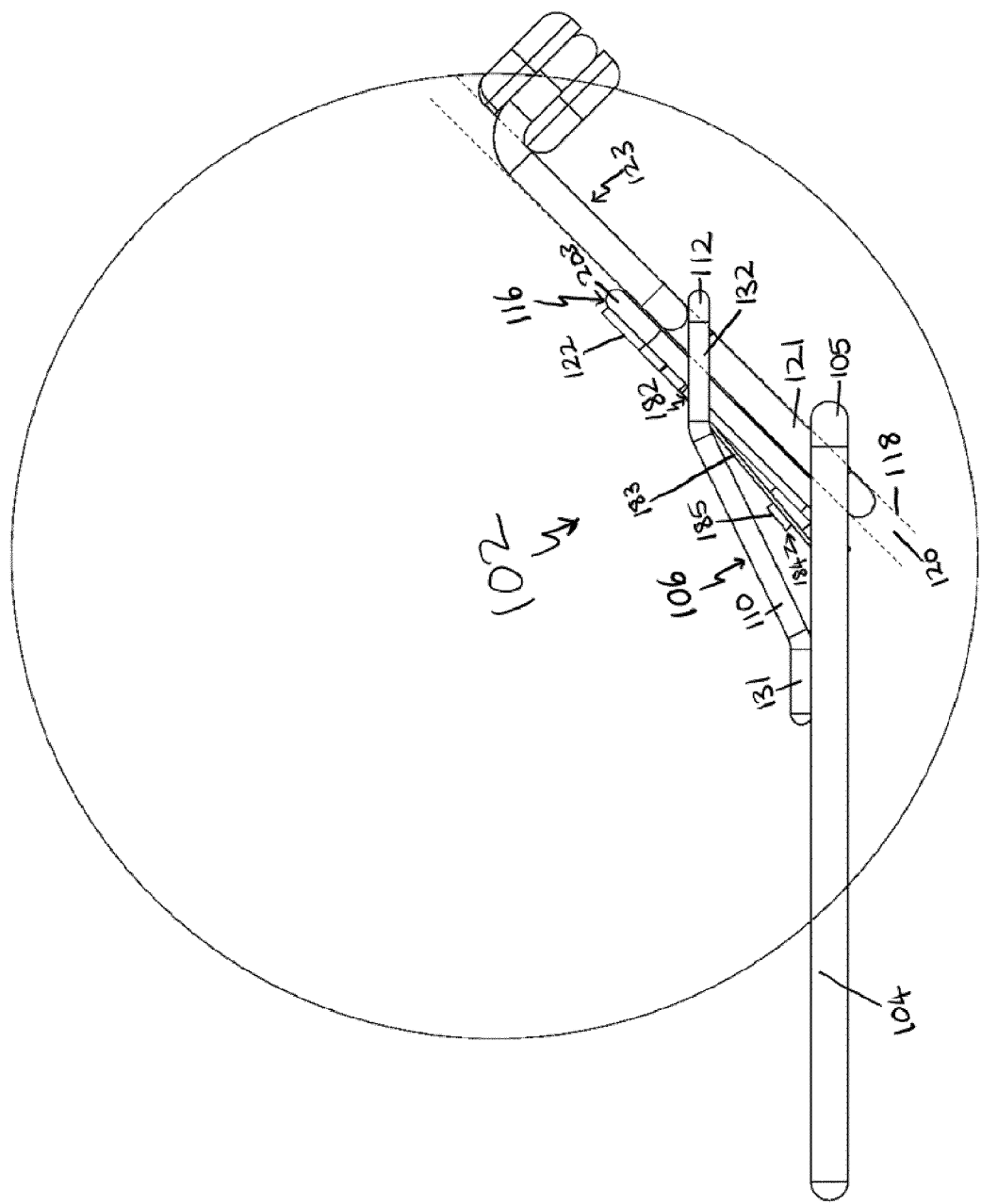
FIG. 6 shows a side view of an alternative embodiment of a luggage holder with a handle in position.

FIG. 6 discloses an alternative embodiment of a luggage holder (hereinafter "the holder 102") with a configuration similar to that shown in FIG. 5. The basic frame structure is generally the same as the embodiment shown in FIG. 1. The holder 102 includes a first u-shaped rail (hereinafter "the first rail 104") arranged to be cantilevered at its open end from the seat post of a bicycle in a generally horizontal plane using a suitable clamping or bracketing means like that shown in FIG. 3. The first rail 104 includes a closed distal end 105.

The holder 102 further includes a second u-shaped rail (hereinafter "the second rail 106") substantially superimposed over the first rail 104, like the first rail 4 and second rail 6 shown in FIG. 2. The second rail 106 generally includes three sections: a lower end section 131; a central section 110; and, an upper end section 132 terminating in a closed distal end 112. The lower end section 131 is fixedly attached to a middle region of the first rail 104. The central section 110 is upwardly inclined and terminates at the upper end section 132, which extends in a generally horizontal plane. This arrangement ensures that the upper end section 132 of the second rail 106 is offset by a distance from and substantially parallel with the first rail 104.

Figure 7:
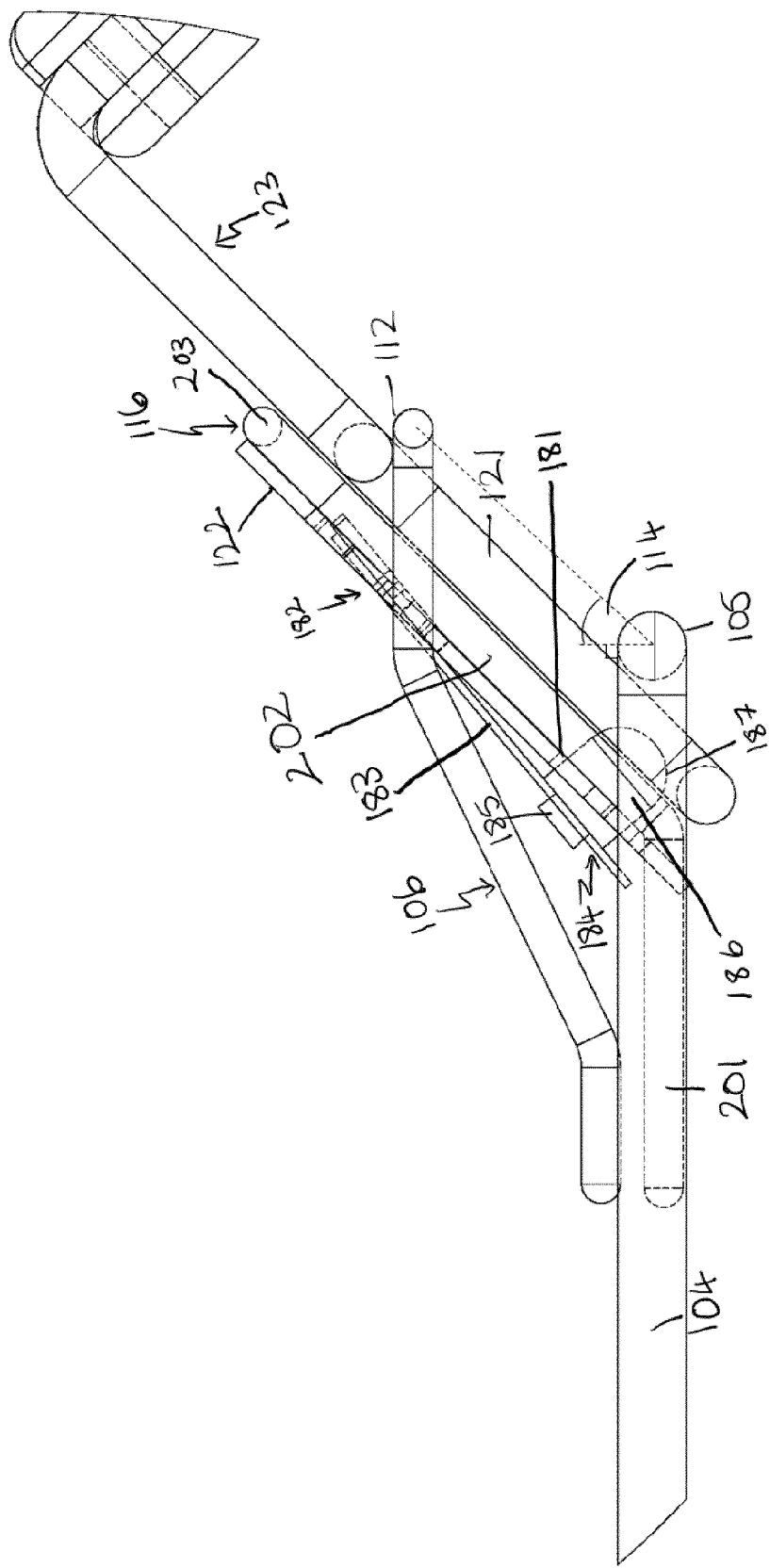
FIG. 7 shows an enlarged view of the luggage holder as encircled in FIG. 6 including some features in dashed lines to show how the parts interact.
Figure 8:
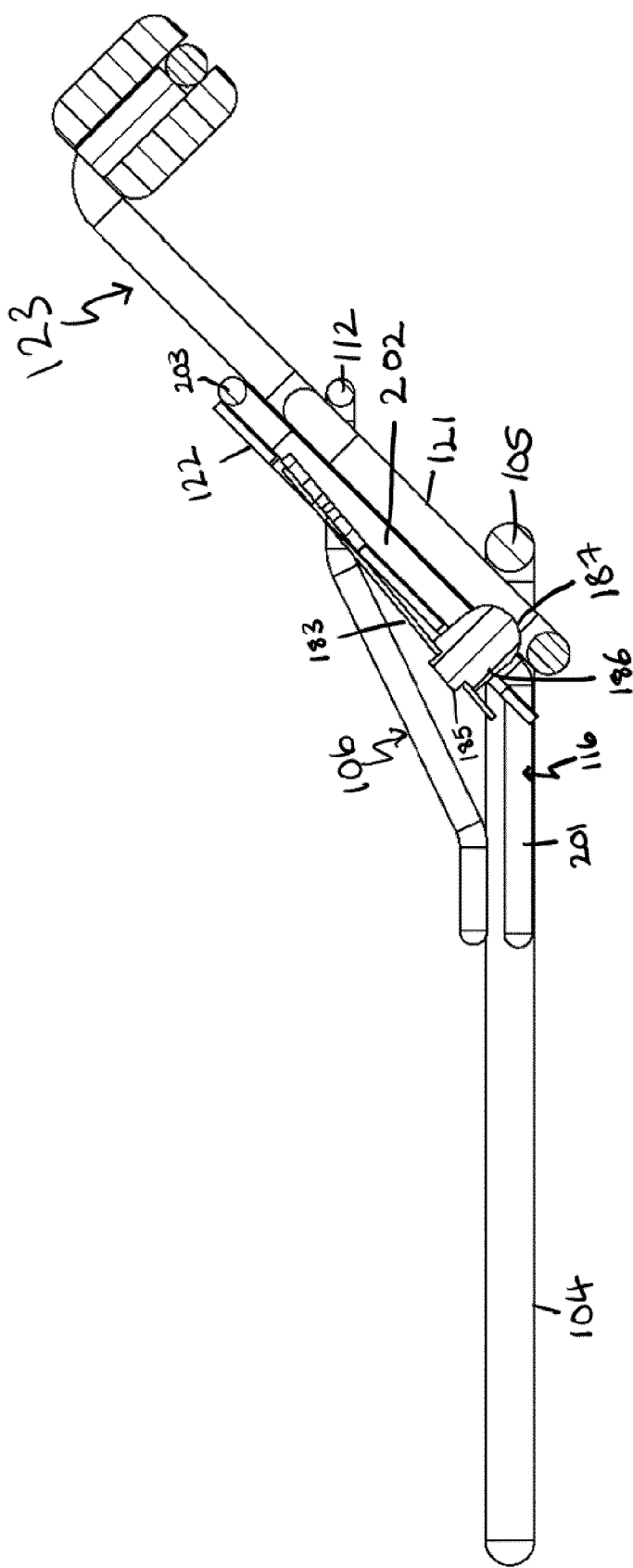
FIG. 8 is a cross-sectional view of the luggage holder of FIG. 6 along 1-1 (as shown in FIG. 9)

With reference to FIG. 6, 7, 8, a distal end 112 of the second rail 106 extends beyond the distal end 105 of the first rail 104, as in FIG. 3. That is to say, the distal end 112 of the second rail 106 overhangs or protrudes beyond the distal end 105 of the first rail 104. This protrusion offsets the distal ends 105, 112 by an acute angle 114 as shown in FIG. 7, measured from a plane perpendicular to the first rail 104. In the embodiment shown, the angle 114 is less than 45 degrees but it will be apparent to those skilled in the art that the angle 114 could be 45 degrees or greater.

The holder 102 further includes a third u-shaped rail (hereinafter "the third rail 116") interposed between and fixedly attached to each of the first and the second rails 104, 106. In contrast with the arrangement of FIG. 1, the third rail 116 includes two sections: a lower end section 201 and an upper end section 202 terminating in a closed distal end 203, as shown in FIG. 7. The lower end section 201 is angled relative to the upper end section 202. The lower end section 201 is parallel to the first rail 104. The lower end section 201 of the third rail is fixedly attached to and aligned with the lower surface of the first rail 104. The upper section 202 of third rail 116 is spaced substantially equally from the distal ends 105, 112 of the first and the second rails 104. The upper section 202 is arranged at an angle substantially equal to the angle 114 formed by the offset between the distal ends 105, 112. The combination of the third rail 116 and the distal ends 105, 112 of the first and the second rails 104, 106 establishes a boundary 118, indicated by broken lines in FIG. 6, which defines a channel 120 extending through the first and the second rails 104, 106. The channel 120 includes a generally uniform cross-sectional area and is configured to receive a tongue 121 of a handle member 123.

Figure 9:
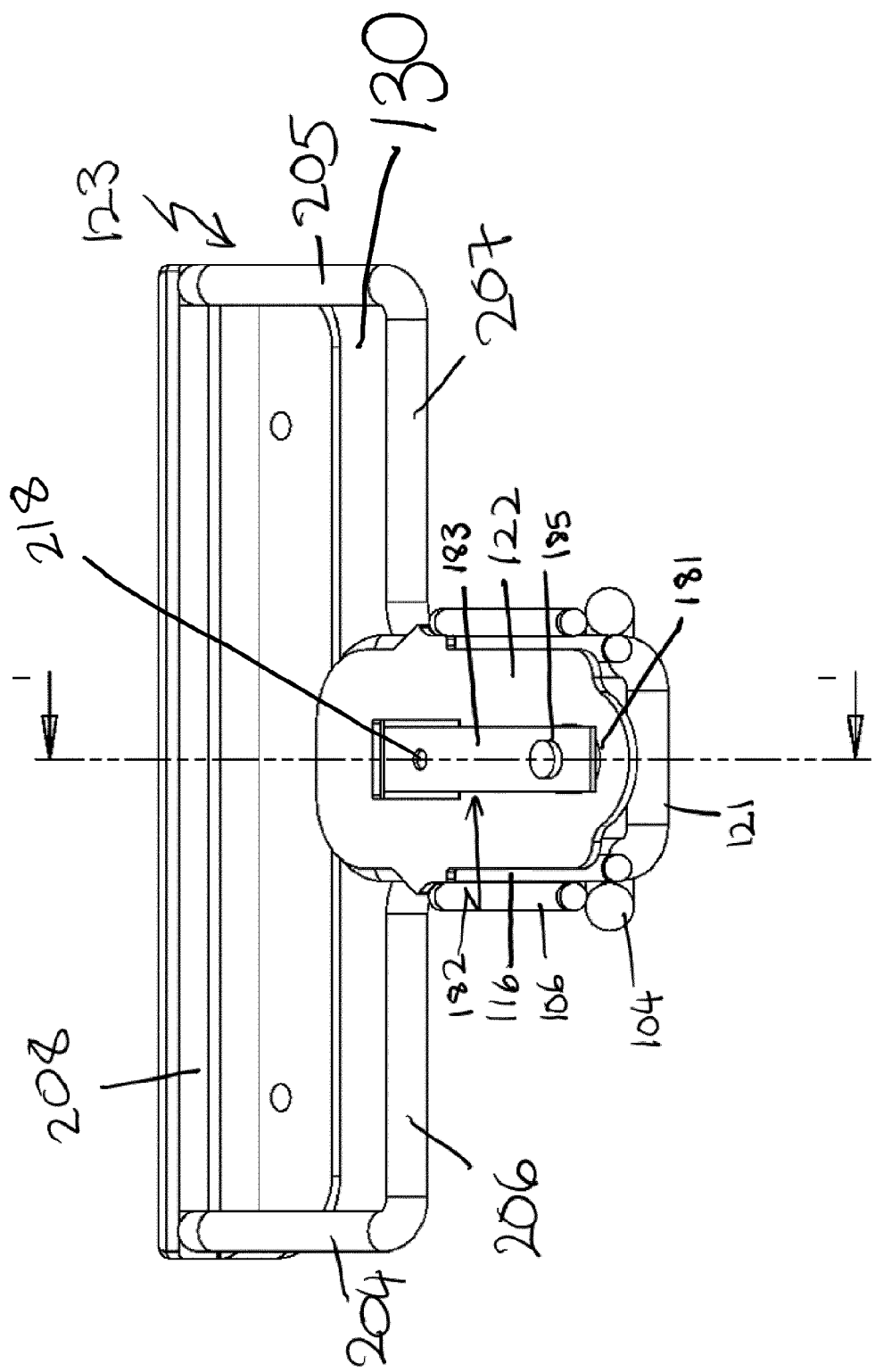
FIG. 9 shows a rear view of the handle and the luggage holder of FIG. 6.

The tongue and handle member as shown in FIG. 9 are identical to that of FIG. 4 including a generally open handle formed of a bent metal rod of circular cross section which defines a generally rectangular opening formed of two short sides 204, 205 which are substantially parallel and two aligned longer sides 206, 207 perpendicular thereto. The tongue section extends transversely from the longer sides 206, 207. The tongue section has a u-shape form. The tongue 121 includes a hollowed or open frame section 130, identical to hollowed section 30 of FIG. 4. The cross-sectional dimensions of the tongue 121 are substantially similar to the cross-sectional dimensions of the boundary 118, such that the tongue 121 is guided through the channel 120 by the boundary 118 so as to minimise lateral motion therebetween. The tongue 121 of handle member 123 is shown positioned in the channel 120 in the alternative example of FIG. 6, 7, 8.

In the embodiment shown in FIG. 7, a plate 122 with a generally circular aperture 181 is fixedly attached to the third rail 116 and so substantially superimposed over the tongue 121 of handle member 123 when the tongue 121 is inserted into channel 120.

The handle member is retained in the holder 102 by a locking device (hereinafter "the locking device 182"). The locking device 182 includes a movable member in the form of a sprung rectangular plate (hereinafter "the spring plate" 183). One end of the spring plate 183 is attached to plate 122 using a nut 209 and bolt 210 or other fixing (shown in FIG. 10 and FIG. 11) through a hole 218 in the spring plate 183 and into hole 221 in plate 122. such that the locking device 182 may pivot away from plate 122. The spring plate could also be permanently fixed to the plate 122, for example by welding or other suitable means.

The locking device 182 further includes a protrusion 184, attached to the spring plate 183 towards the end away from the plates attachment to the plate 122.

The protrusion 184 is formed of a cylindrical portion 186 with a hemispherical end 187 attached to the spring plate 183 by means of fixture such as a rivet or a coupling with an interference fit at one end 185. The hemispherical end 187 is positioned at the distal part of the locking device 182, furthest from the spring plate 183. The spring plate 183 is substantially aligned with the plate 122 when the tongue 121 is not present in the channel 120.

The hemispherical end 187 of the protrusion 184 may move in and out of the generally circular aperture 181 by action of the tongue 121. When tongue 121 is inserted with sufficient force into the channel 120, the rounded end of the tongue 121 follows the shape of the hemispherical end 187 of the protrusion 184, moving the cylindrical portion 186 and hemispherical end 187 away from the distal end 105 of the first rail 104. The smooth shape of the hemispherical end 187 therefore prevents jamming of the tongue 121 upon insertion and extraction.

The spring plate 183 provides a bias such that when in a first position, the spring plate 183 lies substantially flush to plate 122 and the hemispherical end 187 of the protrusion 184 is at the closest position to the distal end 105 of the first rail 104 at the mid-point of channel 120. As the tongue 121 is inserted, the spring plate 183 may be moved to a second position whereby the hemispherical end 187 of protrusion 184 is at the furthest position from the distal end 105 of first rail 104. The spring plate 183 provides sufficient biasing force in the first resting position to prevent unwanted movement or accidental removal of the handle member 123 when tongue 121 is inserted into channel 120.

The locking device 182 moves away from the distal end 105 of the first rail 104 upon insertion of the tongue 121 into the channel 120 as the tongue 121 pushes against the hemispherical end 187. In this position, whereby the hemispherical end 187 of the locking device 182 is at its furthest point from the distal end 105 of the first rail 104, the tongue 121 continues to move down the channel 120 until end of tongue 121 passes the cylindrical portion 186 and hemispherical end 187 of the protrusion 184. The cylindrical portion 186 and hemispherical end 187 then returns to the first position and moves into the hollowed section of tongue 121. The tongue 121 is maintained in this position unless the handle member 123 is forcefully removed from the holder 102 using a force at least equal to a predetermined biasing force of the spring plate 183. Upon removal, the locking device 182 returns to its first resting position.

In the embodiments shown, the rails are formed of bent rods with circular cross-section. The frame structure described is particularly advantageous in allowing the luggage holder to be manufactured with minimal components. However, the structure may comprise a box section or other suitable section arranged to provide a suitable channel to receive the tongue of the handle.

Figure 10:
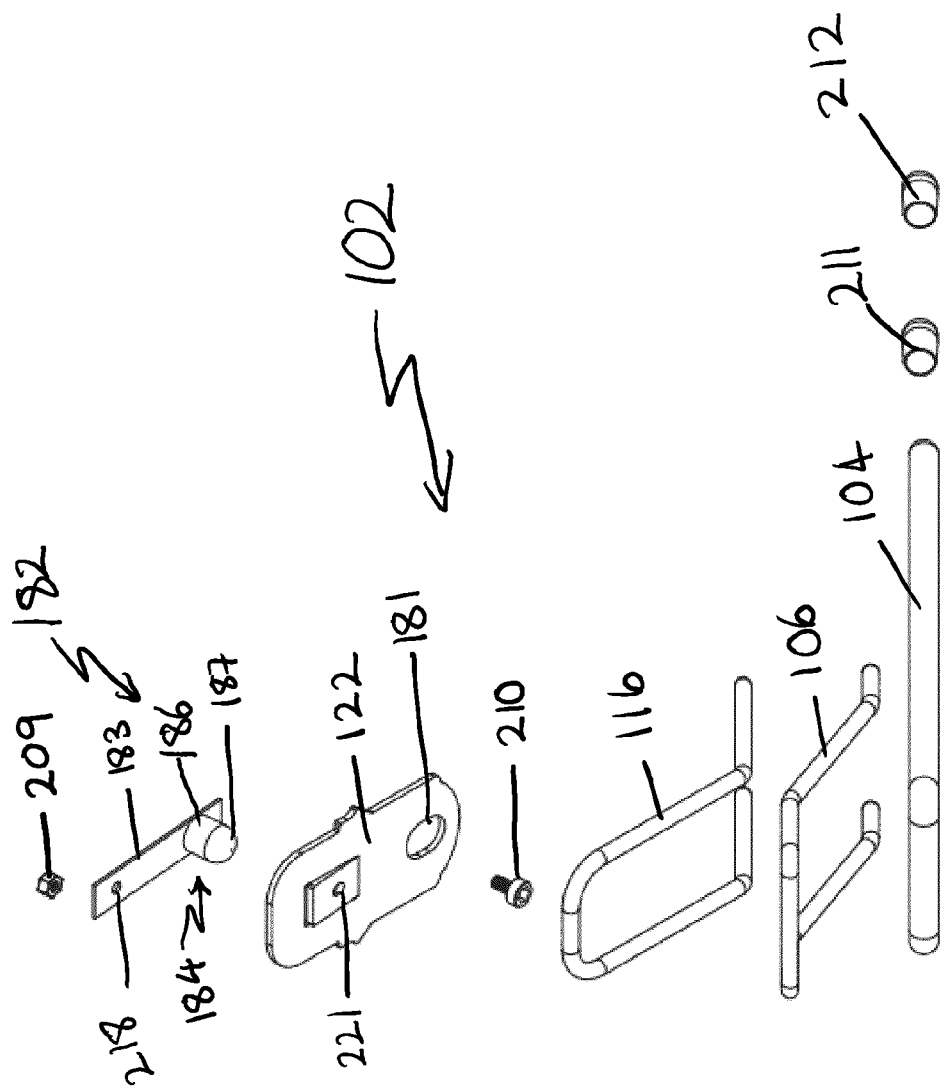
FIG. 10 shows an exploded view of the component parts of the luggage holder of FIG. 6.

FIG. 10 shows an exploded view of the component parts of the holder 102. The spring plate 183 is attachable to the plate 122 by a nut 209 and bolt 210 through hole 218 in the spring plate 183 and hole 221 in the plate 122. It will be apparent to those skilled in the art that the spring plate 183 can be attached to the plate 122 by any alternative fixing. In the embodiment shown, the holder 102 additionally includes protective end caps 211 and 212, which may be formed of a plastic material. The rail or frame portions 104, 106 and 116 are shown, which may be joined using welding or other fixing methods.

Figure 11:
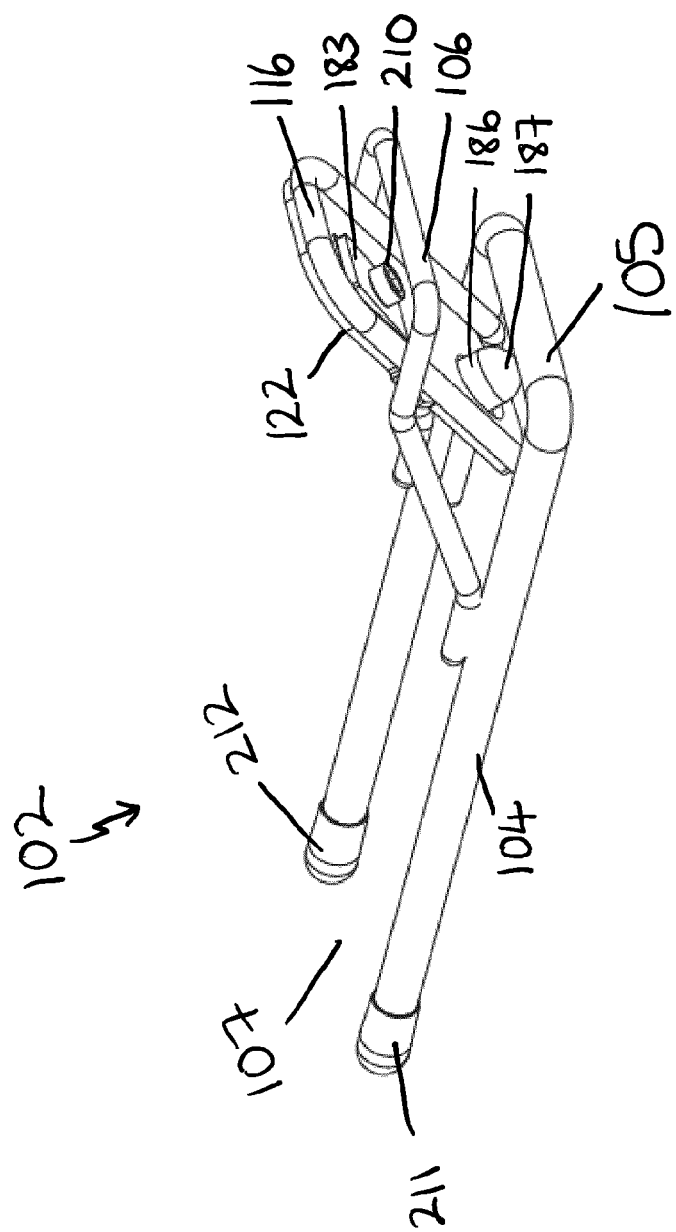
FIG. 11 is a perspective view of the luggage holder of FIG. 6.

FIG. 11 shows a perspective view of the holder 102 before insertion of the handle. The open end 107 of the holder 102 is visible in this embodiment. The holder 102 can be cantilevered at its open end 107 from the seat post of a bicycle in a generally horizontal plane using a suitable clamping or bracketing means.

Figure 12:
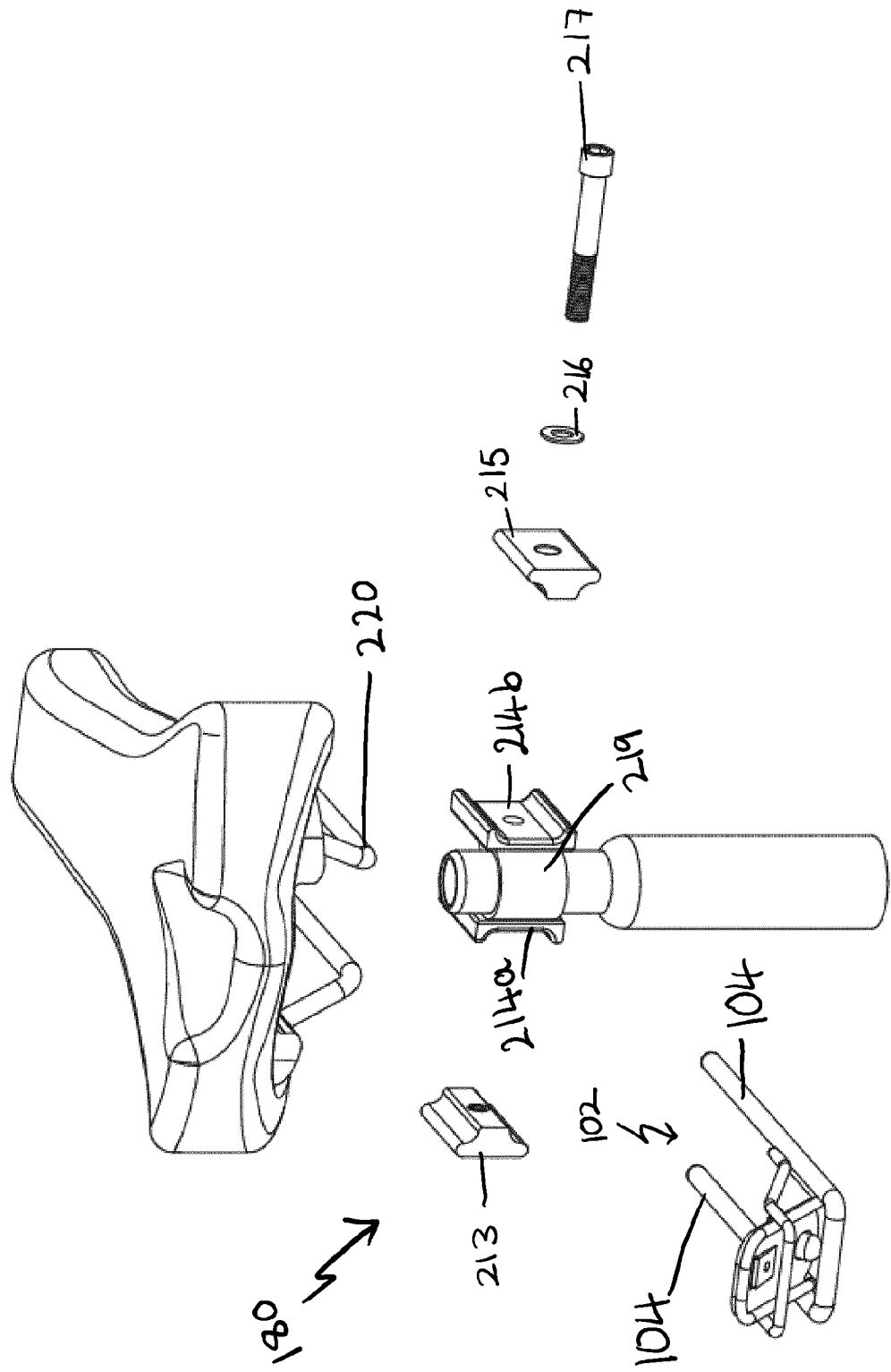
FIG. 12 shows an exploded view of a clamping arrangement including the luggage holder of FIG. 6.

FIG. 12 shows an exploded view of an integrated seat post bracket 180, identical to the clamping or bracketing means 80 of FIG. 3 and FIG. 5. The bracket 180 includes a pair of fixing plates 213, 215, which are attachable to a seat post fixture including a pair of correspondingly shaped base plates 214a, 214b. The fixture is placed on to the seat post using a split sleeve 219 and is coupled to the seat post and seat base frame 220 by clamping the seat base frame 220 on each side between the fixing plates 213, 215 and base plates 214a, 214b using bolt 217 at the top portion of the bracket 180. The ends portions of the first rail 104 of holder 102 are also clamped similarly at the bottom portion of the bracket 180.

Figure 13:
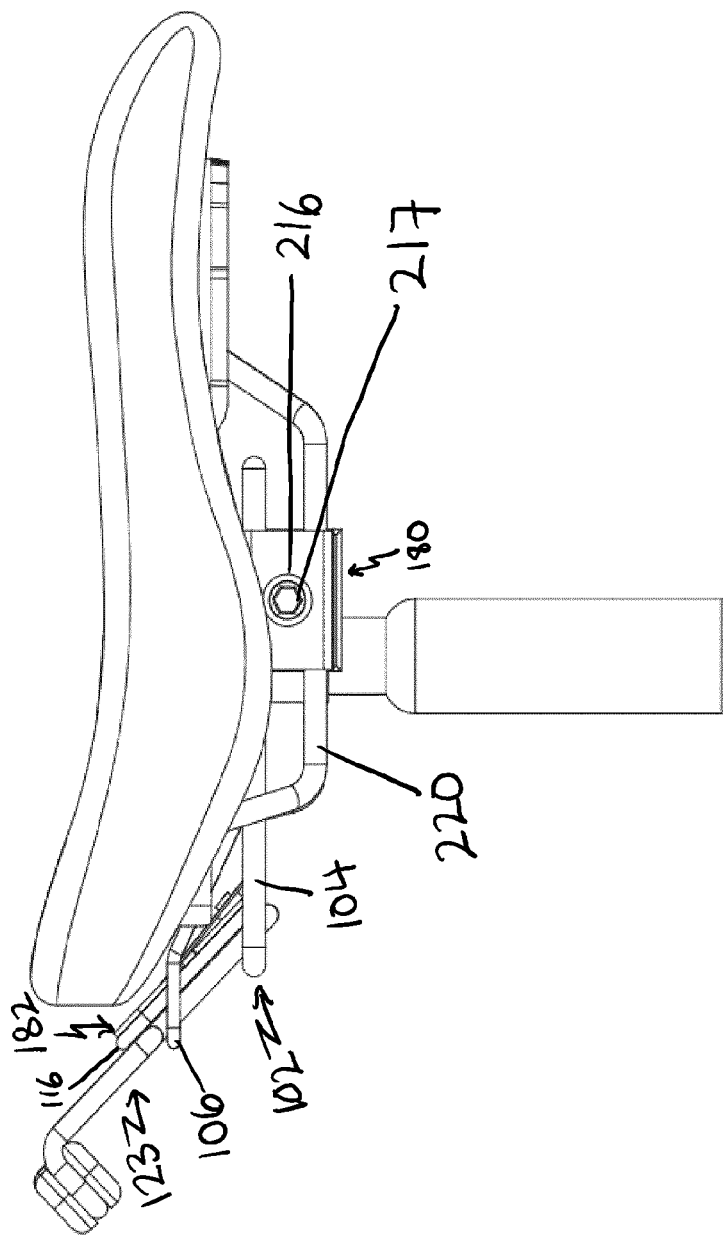
FIG. 13 shows a side view of the luggage holder of FIG. 6 including the handle of FIG. 6.

FIG. 13 shows a side view of the luggage holder 102, similar to the embodiment shown in FIG. 5, with the locking device 182 in a secured position to hold the handle member 123 in place.

Figure 14:
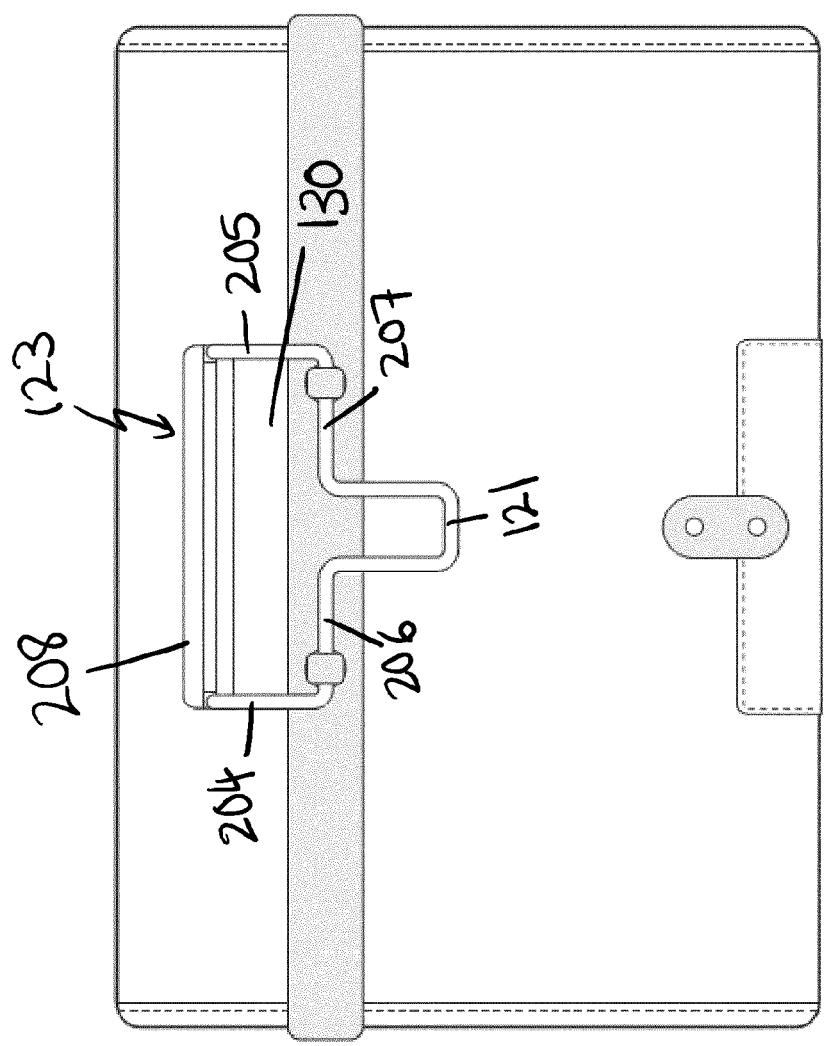
FIG. 14 shows the handle of FIG. 6 attached to an item of luggage.
Figure 15:
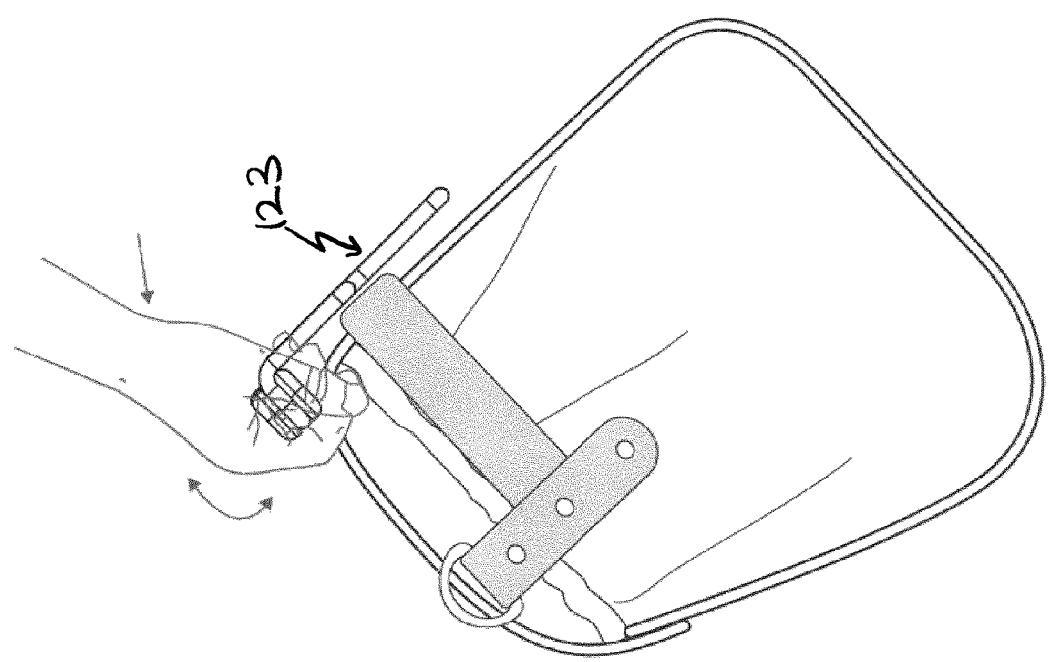
FIG. 15 is a side view of the handle of FIG. 6 attached to an item of luggage and held by a user.
Figure 16:
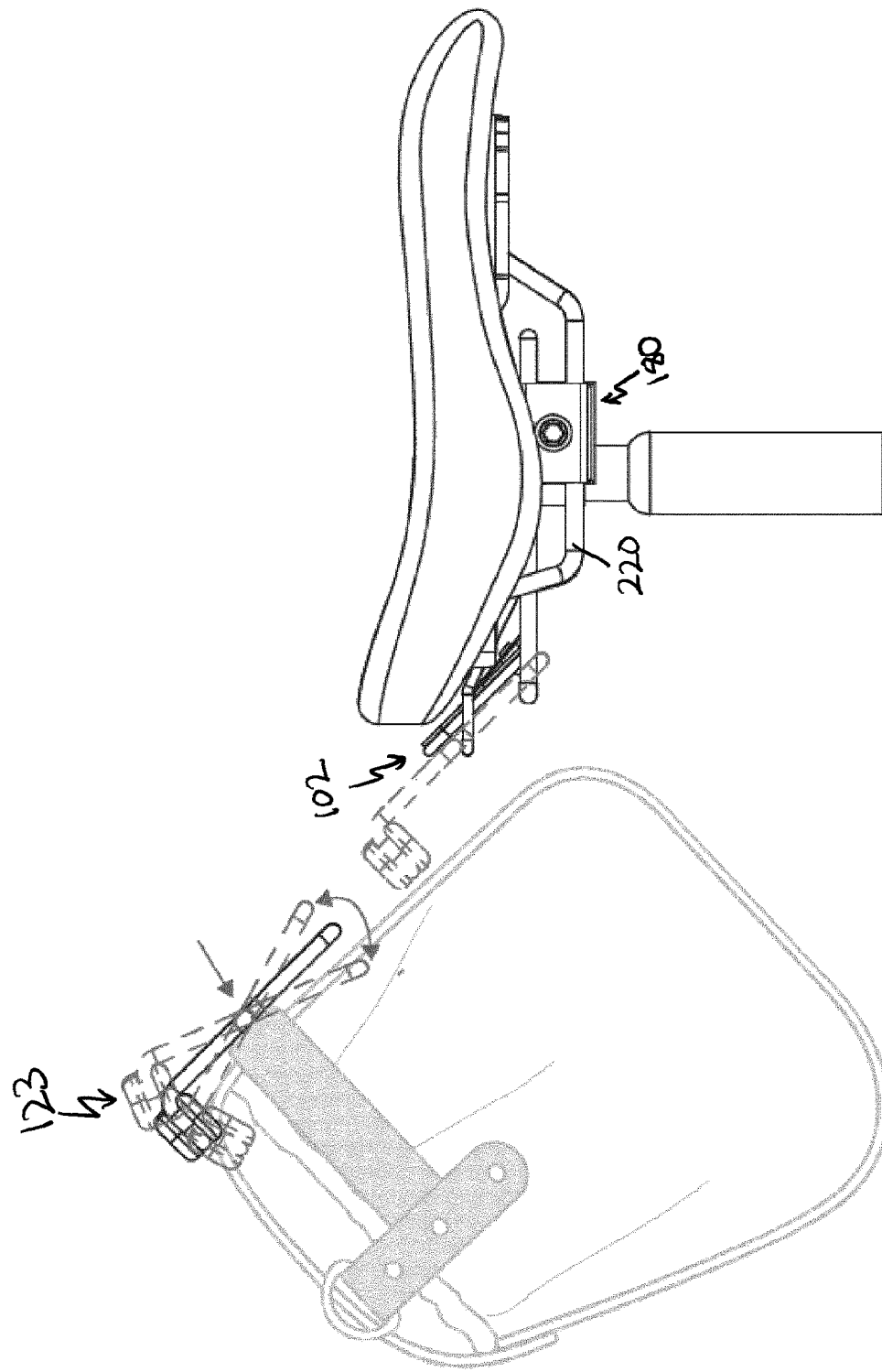
FIG. 16 shows a side view of the luggage holder of FIG. 6 including the handle of FIG. in various pivoting positions on the luggage.

The handle member 123 is arranged to be securable to luggage, such as a saddle bag, for example, by means of wrapping luggage straps on the luggage around sides 206 and 207 as shown in FIG. 14. The angle by which the user manipulates the handle member 123 using handle grip 208 controls the angle of the tongue 121, allowing ease of location and insertion of the tongue 121 in the channel 120 of the holder. Sides 206 and 207 can act as pivots with the luggage such that the tongue 121 may be manipulated independently of the luggage through the handle grip 208, as shown in FIG. 15 and FIG. 16. Advantageously, the design of the handle member 123 and its attachment to the luggage allows the tongue to be manipulated and pivoted away from the bag to allow it to be easily guided into the channel 120.

FIG. 17 shows the positioning of luggage when attached to handle member 123 and inserted into and coupled to holder 102.

FIGS. 18a-18f show an alternative movable member in the form of a wire spring element 324. The spring element 324 is formed as a generally u-shaped loop which extends into spring coils 327 at each side. The dimensions shown are provided purely as an example and will be chosen depending on the application.

Figure 20A:
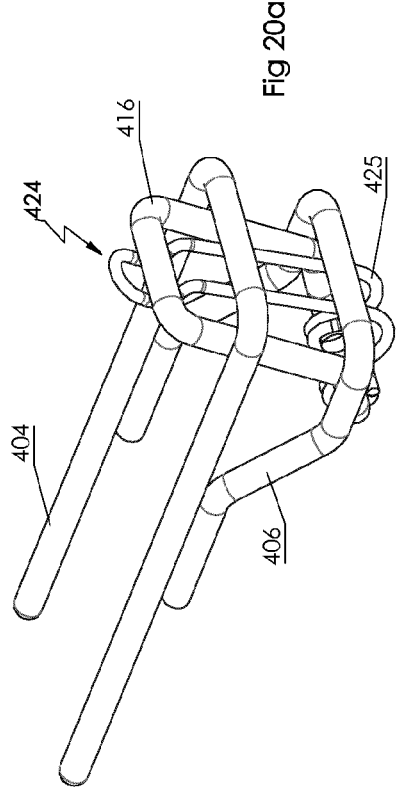
FIGS. 20a-20c show a holder incorporating the movable member of FIGS. 19a-19f.
Figure 20B:
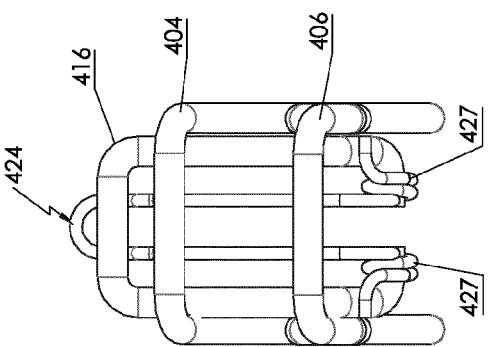
Figure 20C:
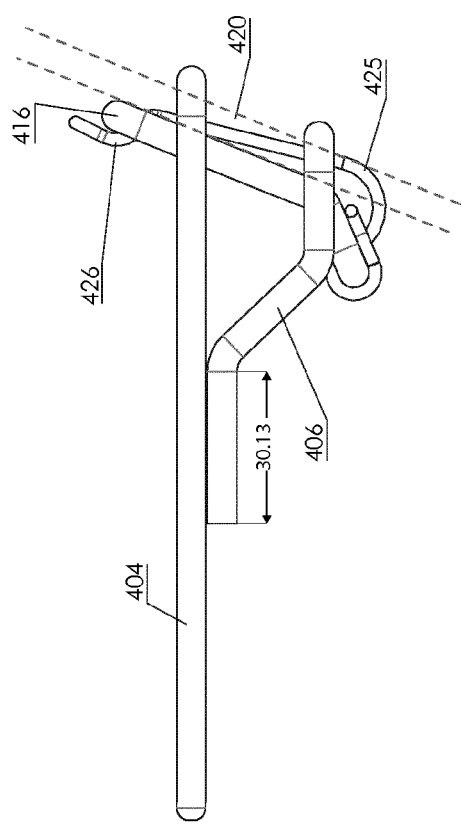

FIGS. 19a-19f show another alternative movable member in the form of a wire spring element 424. The spring element 424 is formed as a generally u-shaped loop which extends into spring coils 427 at each side. The dimensions shown are provided purely as an example and will be chosen depending on the application. At the end distal the spring coils, the u-shaped loop has a stepped end 426. This stepped end 426 may locate against the frame of a holder 402 such as that shown in FIGS. 20a to 20b. The curved lower portion 425 of the spring element functions much like the apex of the spring 24 shown in FIG. 1. A tongue may be inserted in the channel 420 formed by the frame parts 416, 406, 404. Insertion of the tongue of a handle member as described in FIG. 14 over the curved lower portion 425 causes the spring member to be moved to allow the tongue to be inserted before moving back to lock in the opening in the tongue.

It will be apparent to those skilled in the art that the locking arrangement of either embodiment can be combined with a channel formed by an alternative frame structure sized and angled to accept the tongue of the handle member.

It will also be apparent to those skilled in the art that the holder 2 does not necessarily need to be cantilevered from the bicycle in a generally horizontal plane, but instead could extend in an angled plane.

The invention claimed is:

1. A luggage holder for use with a bicycle, the luggage holder comprising:
   a structure including a channel for receiving a tongue of a handle member;
   the handle member being configured to be securable to luggage; and,
   a retaining mechanism including a moveable member which is displaceable from a biased position by insertion or withdrawal of the tongue in or from the channel using a predetermined force to permit insertion or withdrawal of the tongue in or from the channel but which returns to the biased position to prevent withdrawal of the tongue from the channel using a force less than the predetermined force;
   the structure including a first rail;
   the structure including a second rail spaced from the first rail; and
   the structure including a third rail interposed between the first and the second rails, wherein distal ends of the first and the second rails and the third rail in combination define said channel.

2. A luggage holder as claimed in claim 1, wherein the second rail is superimposed over the first rail in a parallel relationship therewith, wherein one of the first rail or the second rail is configured to be cantilevered from the bicycle.

3. A luggage holder as claimed in claim 2, wherein the distal end of the second rail extends beyond the distal end of the first rail such that an acute angle is formed between the distal ends when measured from a plane perpendicular to the first and the second rails, and wherein the third rail is inclined by the acute angle.

4. A luggage holder as claimed in claim 3, wherein the acute angle is less than 45 degrees.

5. A luggage holder as claimed in claim 3, wherein the acute angle is substantially 45 degrees or greater.

6. A luggage holder as claimed in claim 2, wherein the moveable member includes an arcuate cantilever spring fixed at one end to an upper section of the third rail, the arcuate cantilever spring being arranged in the biased position to substantially traverse the channel.

7. A luggage holder as claimed in claim 6, wherein the arcuate cantilever spring is configured such that its apex is adjacent the distal end of the first rail.

8. A luggage holder as claimed in claim 6, wherein the arcuate cantilever spring is configured such that its apex abuts the distal end of the first rail.

9. A luggage holder as claimed claim 2, wherein the third rail includes two shoulder sections arranged to wrap around an underside of the first rail.

10. A luggage holder as claimed in claim 1, wherein a lower section of the moveable member includes a ledge for supporting an end of the tongue when the tongue is retained in the channel.

11. A luggage holder as claimed in claim 1, wherein the moveable member includes a surface feature or form configured to follow or move over a form or surface of the tongue when the tongue is inserted in the channel.

12. A luggage holder as claimed in claim 11, wherein the surface feature includes one or more of a rounded feature, a cam surface, a chamfer, a lobe, or a fillet.

13. A luggage holder as claimed in claim 12, wherein the movable member includes a protrusion arranged to engage with the tongue when the tongue is inserted fully into the channel.

14. A luggage holder as claimed in claim 13, wherein the protrusion includes a rounded end that is hemispherical in form.

15. A handle comprising a tongue configured to be received in the channel of a luggage holder as claimed in claim 1.

16. A handle according to claim 15, wherein the tongue includes a generally u shaped projection.

17. A handle according to claim 15, comprising one of an aperture, opening, cavity, or indentation to receive the movable member of the holder to provide a degree of interlocking therebetween.

18. A handle according to claim 15, wherein the handle is formed generally in the shape of a "T".

19. A kit of parts comprising:
   a luggage holder as claimed in claim 1;
   a handle member including a tongue arranged to be inserted in the channel of the luggage holder; and
   means for clamping the luggage holder to the bicycle.

20. A luggage holder for use with a bicycle, the luggage holder comprising:

a structure including a channel for receiving a tongue of a handle member; the handle member being configured to be securable to luggage;

a retaining mechanism including a moveable member which is displaceable from a biased position by insertion or withdrawal of the tongue in or from the channel using a predetermined force to permit insertion or withdrawal of the tongue in or from the channel but which returns to the biased position to prevent withdrawal of the tongue from the channel using a force less than the predetermined force;

the structure including a first u-shaped rail;

the structure including a second u-shaped rail superimposed over the first u-shaped rail in a parallel relationship therewith, wherein one of the first u-shaped rail or the second u-shaped rail is configured to be cantilevered from the bicycle; and the structure including a third u-shaped rail interposed between each of the first and the second u-shaped rails, wherein distal ends of the first and the second u-shaped rails and the third u-shaped rail in combination define said channel.

* * * * *